United States Patent [19]
Kimura

[11] Patent Number: 5,346,457
[45] Date of Patent: Sep. 13, 1994

[54] DEVICE FOR ELIMINATING CURL OF RECORDING PAPER FOR USE IN IMAGE FORMING APPARATUS

[75] Inventor: Yasuo Kimura, Ichinomiya, Japan

[73] Assignee: Brother Kogyo Kabushiki Kaisha, Aichi, Japan

[21] Appl. No.: 50,635

[22] Filed: Apr. 22, 1993

[30] Foreign Application Priority Data

May 27, 1992 [JP] Japan .................. 4-134615

[51] Int. Cl.⁵ .................. B41F 13/54; B65H 23/34
[52] U.S. Cl. .................. 493/320; 493/459; 162/271
[58] Field of Search .............. 493/320, 321, 323, 324, 493/459; 162/271

[56] References Cited

U.S. PATENT DOCUMENTS 5,176,614  1/1993  Krasuski .................. 493/421
5,230,691  7/1993  Monma .................. 493/321

FOREIGN PATENT DOCUMENTS 61-238647  10/1986  Japan.
4-32453  2/1992  Japan.

*Primary Examiner*—William E. Terrell
*Attorney, Agent, or Firm*—Oliff & Berridge

[57] ABSTRACT

A support roller disposed on a side of a case main body of a facsimile apparatus is supported by a pair of right and left end holding members with associated coil springs for urging the support roller upward in an elevatable and oscillatable manner. A nose portion of a curl eliminating plate fixed to the lower surface of an upper cover member, which may be opened and closed, is disposed close to the circumferential surface of the support roller when the upper cover member is closed. When the upper cover member is closed, the support roller is inhibited from moving in either direction with respect to a feed path by restricting members projected downward from the upper cover member. The combination of the support roller and the nose portion of a curl eliminating plate define an S-shaped path through which the paper is fed to eliminate curl.

17 Claims, 4 Drawing Sheets

DEVICE FOR ELIMINATING CURL OF RECORDING PAPER FOR USE IN IMAGE FORMING APPARATUS

BACKGROUND OF THE INVENTION

1. Field of the Invention

The invention relates to a device for eliminating curl of a roll of recording paper for use in an image forming apparatus such as a facsimile apparatus or a copying machine, where image formation is carried out while drawing the recording paper from the roll.

2. Description of the Related Art

A curl eliminating device is disclosed in Japanese Patent Publication No. Hei 1-57019, where a roll of paper is folded in a direction opposite to a curling direction by utilizing tension to eliminate the curl.

Although the tension applied to a roll of paper is set constant, the magnitude of force exerted on the curl eliminating device is changed because the dead load of the roll of paper is changed depending on the amount of the roll of paper remaining. Namely, if the remainder of the roll of paper is large, the dead load of the roll of paper is large so that the force exerted on the curl eliminating device is also large. On the other hand, if the remainder of the roll of paper is small, the dead load of the roll of paper is small and, consequently, the force exerted on the curl eliminating device becomes smaller than that in the case where there is a large remainder of the roll of paper. It follows that the curl eliminating device cannot be operated with an adequate force all the time, with attendant problems that satisfactory curl elimination is inhibited due to a change in the force, and that curl, far from being eliminated, is also caused in the opposite direction for a part of the roll.

Also among devices for eliminating curl of recording paper, one type is proposed by applicant in Japanese Laid-Open Patent Publication No. 4-32453, which has not yet been examined, wherein the curl eliminating device is provided on a recording paper feed path, which extends from the upward rear edge of a substantially semi-cylindrical recording paper tray having an upward opening to an image recording unit, formed in a main body case of a facsimile apparatus. The curl eliminating device comprises a support roller and a curl eliminating plate having a downward curved projection disposed close to the support roller, wherein the recording paper discharged from the recording paper tray is passed through a V-shaped path, viewed from the side, in a direction opposite to that of the curl of the recording paper, thus eliminating the curl.

The curl eliminating plate disposed in the curl eliminating device is fixed to an upper cover member, which is turned openably, and the support roller is disposed on a side of the main body case. Accordingly, the curl eliminating plate is separated from the support roller when the upper cover member is opened in order to supply the recording paper to the recording paper tray, thereby contributing to convenience.

To sufficiently eliminate the curl, it is desirable to bring the curl eliminating plate into close contact with the circumferential surface of the support roller. However, it is not possible to do so as they will interfere with one another.

SUMMARY OF THE INVENTION

The invention solves the above problems. The invention's object is to provide a paper feeder capable of feeding a roll of paper to a curl eliminating device with a constant force so as to satisfactorily eliminate the curl.

Another object of the invention is to restrict the movement of a support roller when an upper cover member is closed while precluding the tip end of a curl eliminating plate, fixed to the upper cover member, from interfering with the support roller when the upper cover member is either opened or closed.

In order to achieve the above-stated objectives, the invention resides in an image forming apparatus such as a facsimile apparatus having, in a case main body, a container unit for holding a roll of recording paper, an image recording unit for forming an image on the recording paper adjacent to the container unit, a curl eliminating unit for curving the recording paper during passage along a feed path of the recording paper from the container unit to the image recording unit, and a cutter for cutting the recording paper with the image formed thereon during discharge from an outlet of the case to the outside. The curl eliminating unit comprises a support member for supporting the lower surface of the recording paper on a side of the case main body, and a curve forming member disposed in an openable cover member for covering the case main body from the upper side so as to press and curve the upper surface of the recording paper downward. The support member is supported via a support means for urging the support member upward in an elevatable and oscillatable manner. In the cover member, there are provided restricting members for restricting the support member from moving lengthwise on the feed path with the main body case closed.

According to the invention, the image forming apparatus is provided with the curl eliminating unit for curving the recording paper into a substantially S-shape during passage along the recording paper feed path interposed between the container unit, for holding the roll of recording paper, and the image recording unit. The curl eliminating unit comprises the support member disposed on a side of the main body case and the curve forming member fixed to the upper cover member. The support member is supported by a support means for urging the support member upward in an elevatable and oscillatable manner.

In the cover member are provided the restricting members for restricting the support member from moving lengthwise on the feed path when the cover member is closed with respect to the main body case. Consequently, the connection between the restricting members and the support member is released when the cover member is opened. As a result, when the cover member is turned downward in the closing direction, the support member can be moved without interfering with the curve forming member.

With the cover member closed for covering the main body case, the support member is inhibited from moving by the restricting members. Because the support member can be positioned in a predetermined positional relationship with respect to the curve forming member, the feed path for curl elimination can be formed stably and constantly into a substantially S-shape. Consequently, curl of the roll of recording paper can be eliminated.

BRIEF DESCRIPTION OF THE DRAWINGS

The invention will be described with reference to the drawings, in which.

DESCRIPTION OF THE PREFERRED EMBODIMENTS

Figure 1:
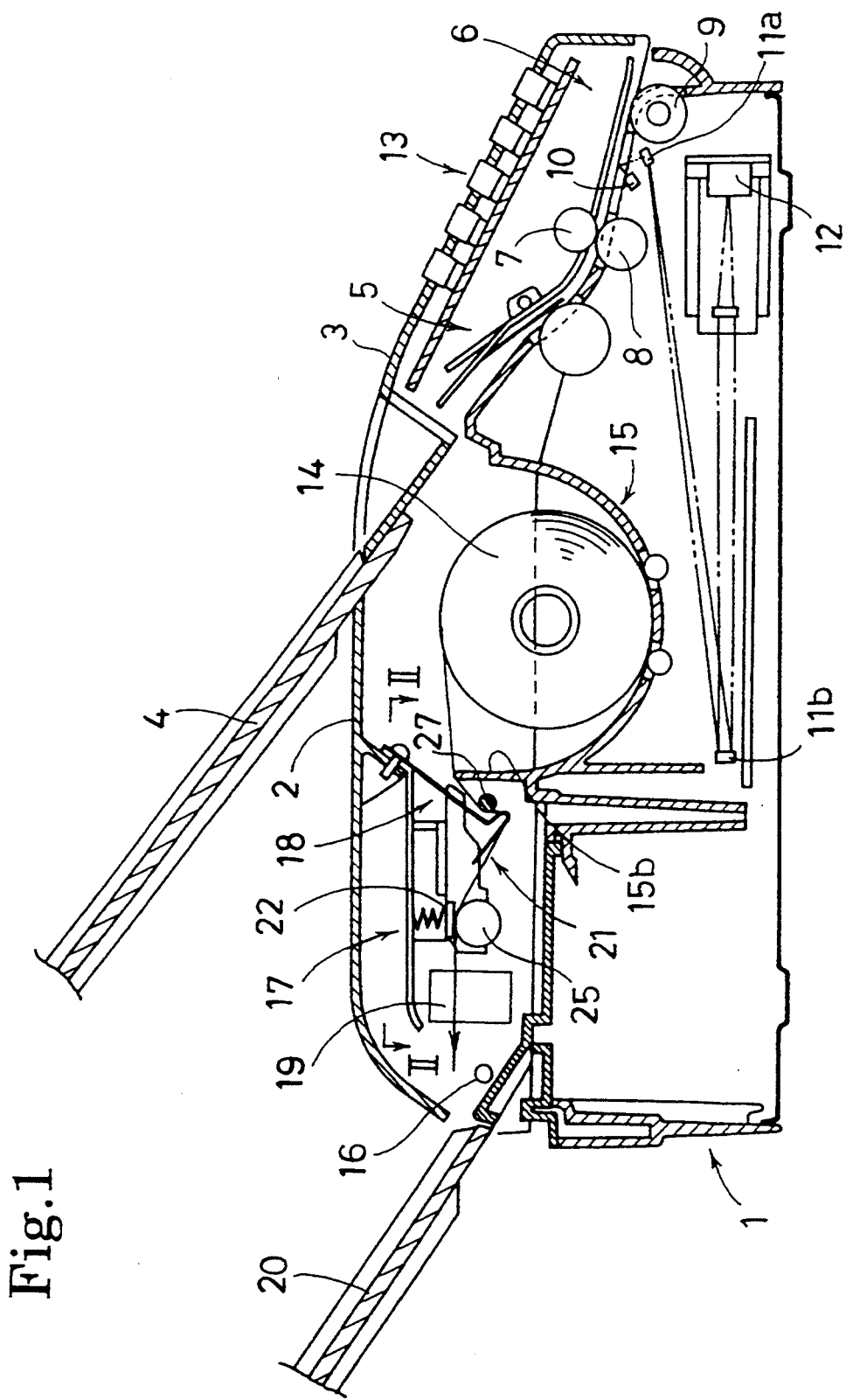
FIG. 1 is a sectional side elevation showing a facsimile apparatus.
Figure 2:
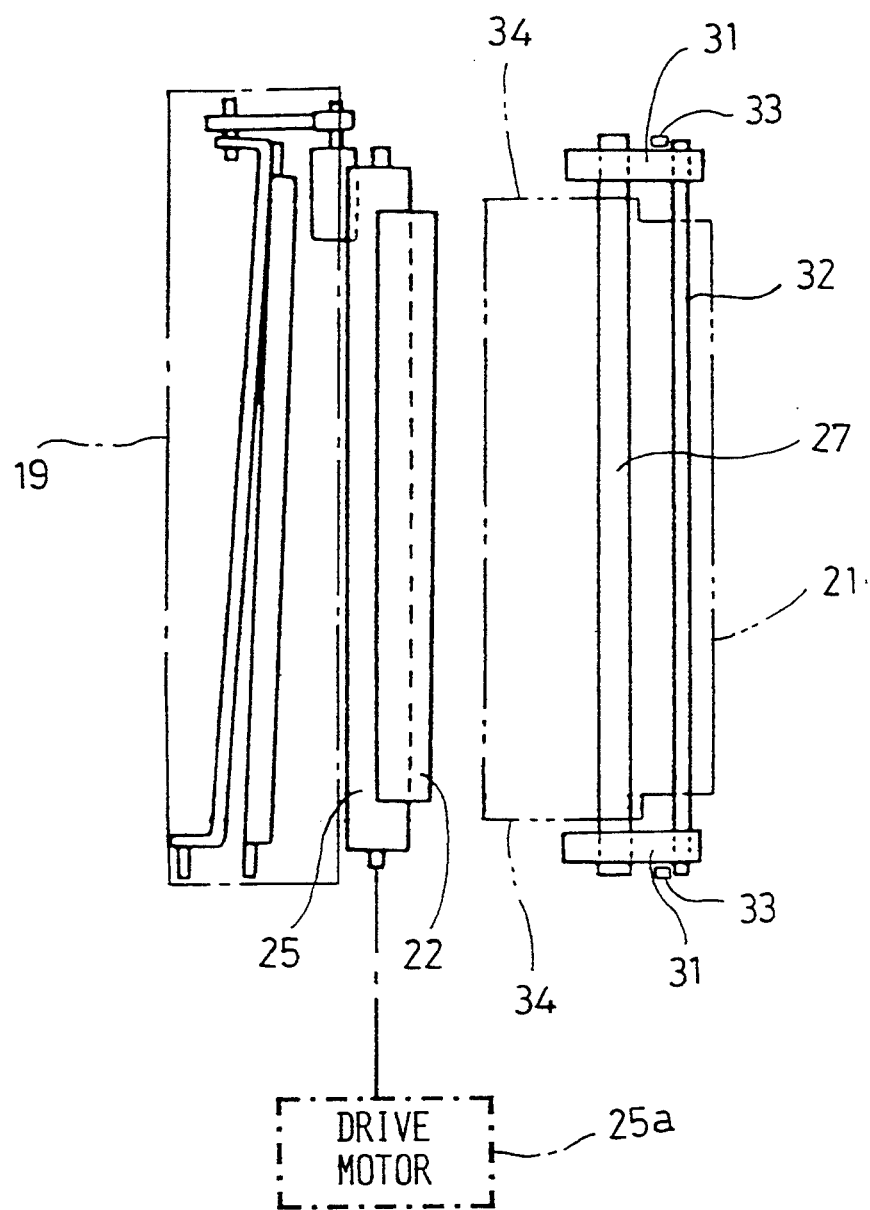
FIG. 2 is a plan view taken on a line II—II of FIG. 1.

A preferred embodiment of the invention will be described hereinafter with reference to FIGS. 1 through 5. The preferred embodiment is described in the context of a facsimile machine but could be applied to a copy machine using rolled paper. FIG. 1 is a sectional side elevation showing a facsimile apparatus according to the invention. There are shown a main body case 1, an upper cover member 2, and a front cover 3. Sheets of originals (not shown) are mounted, with the obverse facing down, on an original tray 4 disposed slantwise between the front cover 3 and the upper cover member 2 and are discharged one by one to an image reading unit 6 by an original separator/feeder 5 disposed in the vicinity of the feed port.

Light emitted from a light source 10, interposed between a feed roller 8 and a paper discharge roller 9, is reflected on the sheet of the original as it is fed between a press-contact roller 7 and the feed roller 8 provided in the image reading unit 6. The reflected light enters into an image pick-up means (a CCD type solid image pick-up element) 12 via a pair of mirrors 11a and 11b and the image is read. The image is transmitted through a transmission unit (not shown). The original sheet, after the image formed thereon has been read, is discharged to the outside of the facsimile machine by the paper discharge roller 9.

A console panel 13 is attached to the front cover 3. A substantially semi-cylindrical upward roll paper tray 15 for holding a roll of recording paper 14, such as heat sensitive paper, is disposed lengthwise in the center of the main body case 1. An image recording unit 17, for use during the receiving of transmissions, is provided under the upper cover member 2. The upper cover member 2 opens upwardly by turning on a pivot portion 16 in the rear portion of the main body case 1. A curl eliminating unit 18 is set on a feed path between the image recording unit 17 and the rear end of the roll paper tray 15. The curl eliminating unit 18 is for curing, or countering, the winding of the roll of recording paper 14. The recording paper 14, with the image recorded thereon in the image recording unit 17, is cut by a cutter 19 and discharged to a paper tray 20.

Figure 3:
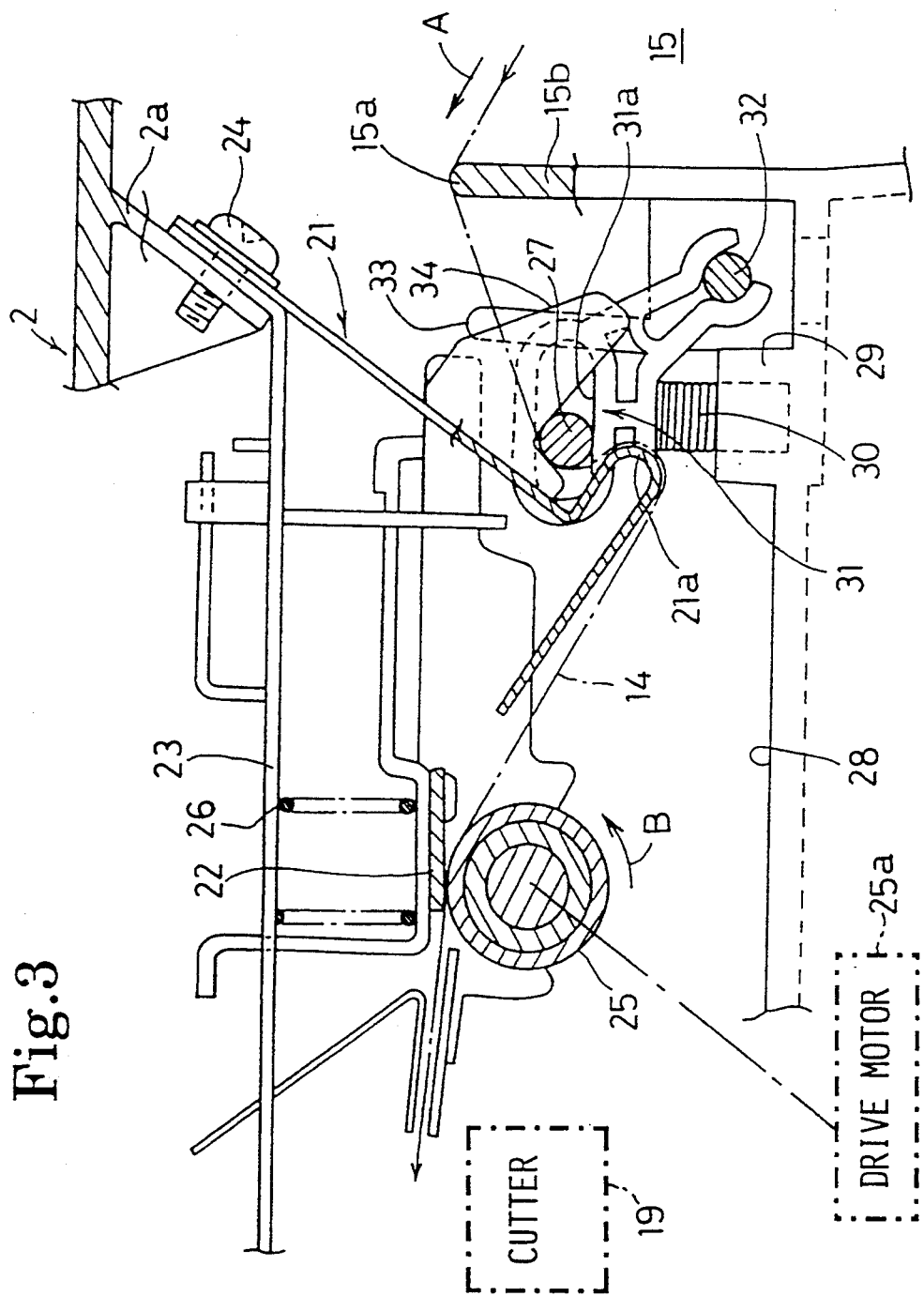
FIG. 3 is a sectional side elevation showing essential parts of a curl eliminating unit with an upper cover closed.

As shown in FIG. 3, a curl eliminating plate 21, i.e., a curve forming member, having a nose portion 21a consisting of a curved projection facing down, is provided in the curl eliminating unit 18. The curl eliminating plate 21, a holding plate 23, for holding a thermal head 22, and a platen roller 25 disposed in the recording unit 17 are fixed to each other by a screw 24 in a lower flange portion 2a of the upper cover member 2. The thermal head 22 is pressed against the upper circumferential surface of the platen roller 25 by a pressing spring 26. The platen roller 25 is driven by a drive motor 25a capable of forward and reverse rotation.

A support member for supporting the lower surface of the recording paper 14 in the curl eliminating unit 18 comprises a support roller 27 having a circular cross section. The support roller 27 is disposed on the feed path between a projecting guide portion 15a, formed at the upper end of a rear piece 15b of the roll paper tray 15, and the curl eliminating plate 21. Namely, the right and left ends of the support roller 27 are movably supported, with respect to the feed direction, in elongated guide portions 31a of a pair of right and left end holding members 31, 31, the base ends of which are pivotally supported by a pivot 32. The right and left end holding members 31, 31 are urged upward by flexible and expansible coil springs 30, 30 which are inserted into right and left disposing portions 29 of a support plate 28 of the main body case 1.

Figure 4:
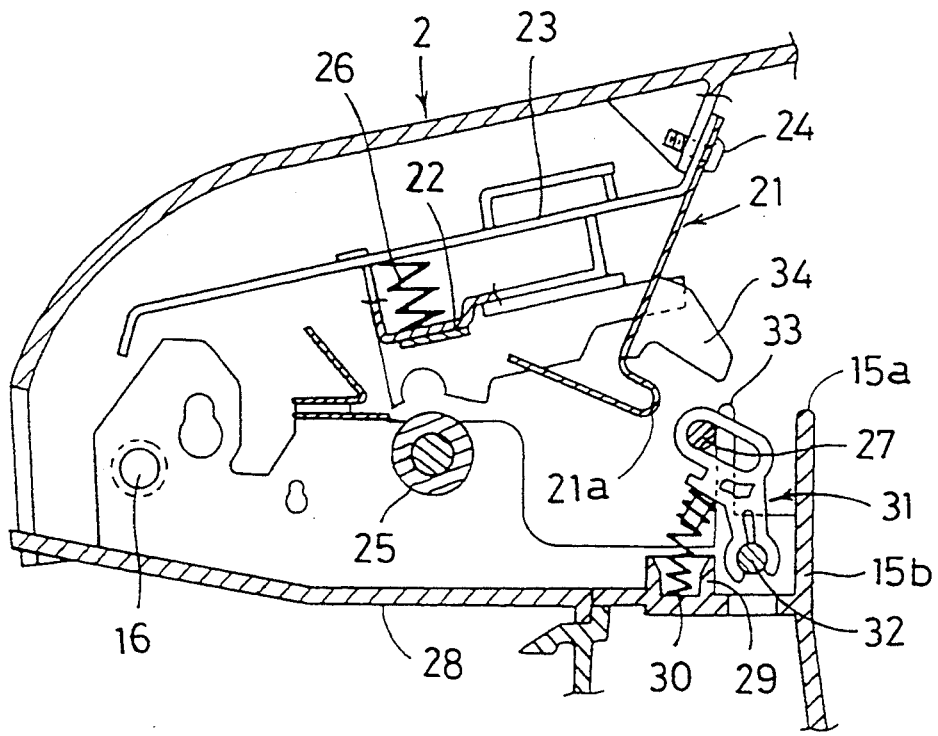
FIG. 4 is a sectional side elevation showing the essential parts of the curl eliminating unit with the upper cover opened.

With the upper cover member 2 opened as illustrated in FIG. 4, the right and left end holding members 31, 31 are inclined in such a manner that the elongated guide portions 31a, 31a of the right and left end holding members 31, 31 are inclined downward toward the rear piece 15b of the roll paper tray 15. The support roller 27, inserted into the guide portions 31a, 31a of the right and left end holding portions 31, 31, is moved away from the pivot 16 serving as the turning axis of the upper cover member 2. In this position, both ends of the support roller 27 are inhibited from moving further away from pivot 16 and downward by right and left stoppers 33, 33 projecting from the support plate 28 or related structure of the main body case 1.

Further, restricting members 34, 34, fixed to the curl eliminating plate 21 or as extensions therefrom according to the invention, are projected forward and downward from the right and left sides in the lower portion of the curl eliminating plate 21. Alternatively, the restricting members 34, 34 can be fixed to the upper cover member separate from the curl eliminating plate 21. In this embodiment, each plate-like restricting member 34 is formed into a hook shape such that the lower edge thereof has an inverted L-shape when viewed from the side.

The position where the support roller 27 is held by the stopper members 33, 33 connotes a position where the support roller 27 cannot interfere with the curl eliminating plate 21 when it abuts against the restricting members 34, 34 during opening and closing of the upper cover member 2.

Figure 5:
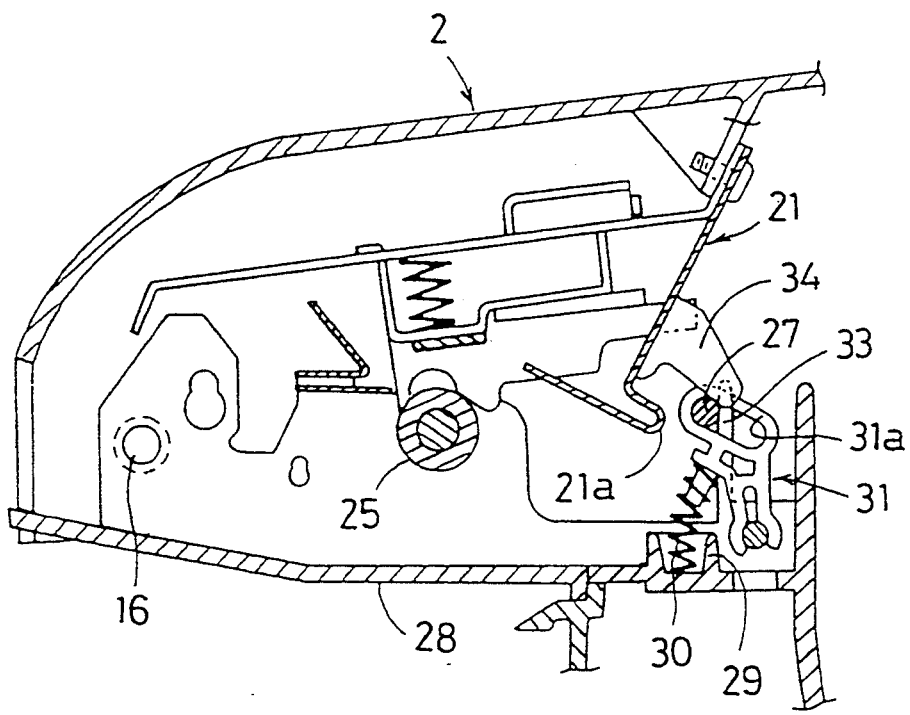
FIG. 5 is a sectional side elevation showing the essential parts of the curl eliminating unit while the upper cover is turned downward.

As the upper cover member 2 is turned downward, the restricting members 34, 34 press downward on the upper surfaces of the right and left ends of the support roller 27 against the urging force of the coil springs 30, 30 (see FIG. 5). When the upper cover member 2 is further turned downward during closing, the support roller 27 is engaged by the lower edges of the restricting members 34, 34 so as to be moved toward the downstream side of feeding. With the upper cover member 2 closed, with respect to the main body case 1 (see FIG. 3), the support roller 27 is restrained from moving lengthwise at the intersection points of the L-shaped lower edges of the restricting members 34, 34.

With this structure, when the upper cover member 2 is opened, as illustrated in FIG. 4, the support roller 27 is positioned more distant from the pivot portion 16. Accordingly, when the upper cover member 2 is turned downward, the nose portion 21a of the curl eliminating plate 21, serving as a curve forming member, does not interfere or collide with the circumferential surface of the support roller 27. When the upper cover member 2 is closed, the support roller 27 is engaged by the restricting members 34, 34 and moved to a position close to the upper side of the nose portion 21a. Consequently, a predetermined feed path can be formed where the recording paper 14 is passed through a curved substantially S-shaped path, when viewed from the side, between the nose portion 21a and the support roller 27.

During recording operation, as indicated by an arrow A in FIG. 3, the recording paper 14 is drawn from the roll paper tray 15 and bent downward at the upper end of the projection guide portion 15a, to be guided over the support roller 27 and around the nose portion 21a of the curl eliminating plate 21 to follow the substantially S-shaped path, when viewed from the side, in a direction opposite to the curl of the roll of recording paper 14. After elimination of the curl, the recording paper 14 passes between the platen roller 25 and the thermal head 22 and is fed toward the cutter 19 by the rotational driving of the platen roller 25 in a direction indicated by the arrow B.

Even if tension is exerted toward the upstream side of feeding of the recording paper 14, the support roller 27 is inhibited from moving toward the upstream side of feeding so that the S-shaped curved path cannot be changed.

In this preferred embodiment, as depicted in FIG. 3, the nose portion 21a of the curl eliminating plate 21 extends to the right beyond a vertical line drawn tangent to the left circumferential surface of the support roller 27. The recording paper 14 is sufficiently curved so that the curl is eliminated. Additionally, the support roller 27 cannot be moved by the tension exerted by the weight of the roll of recording paper 14. Furthermore, the upper cover member 2 can be opened or closed without a special procedure and the curl eliminating plate 21 and the support roller 27 do not interfere with one another during opening and closing.

A roller may be used as the curve forming member in place of the plate-like curl eliminating plate 21 and the nose portion 21a in this preferred embodiment. The restricting members 34, 34 may be fixed directly to the upper cover member 2 or projected from the holding plate 23. It is a matter of course that the invention is also applicable to an image recording unit for a copying machine.

What is claimed is:

1. An image forming apparatus comprising:
   a case main body;
   an openable cover member for covering the case main body;
   means for feeding paper along a paper feed path;
   a container unit mounted in said case main body for holding a roll of recording paper;
   an image recording unit mounted in said case main body for forming an image on the recording paper adjacent to the container unit; and
   a curl eliminating unit for curving the recording paper during passage along the paper feed path of the recording paper from the container unit to the image recording unit, wherein the curl eliminating unit comprises:
   a support member for supporting a surface of the recording paper on a side of the case main body;
   a support means for supporting the support member and urging the support member toward the recording paper in an oscillatable manner;
   a curve forming member disposed in the openable cover member so as to press and curve the recording paper toward the case main body; and
   a restricting member provided in the openable cover member for restricting the support member from moving lengthwise with respect to the paper feed path when the case main body is closed.

2. The image forming apparatus as claimed in claim 1, wherein said restricting member comprises two restricting elements.

3. The image forming apparatus as claimed in claim 2, wherein said two restricting elements are mounted substantially along each side of said curve forming member.

4. A curl eliminating unit for a printing unit, the printing unit having a main body case, a paper tray mounted in the main body case for holding roll paper, means for feeding paper from the roll paper along a paper feed path, and a pivotal cover pivotably mounted to the main body case for providing access to at least the roll paper, the curl eliminating unit comprising:
   a holding member pivotally mounted at each side of said main body case;
   a support roller mounted between said holding members in a manner that permits movement away from and toward the paper tray over which paper being removed from the roll paper passes;
   a curl eliminating plate extending from the pivotal cover and having a nose portion for engaging the paper downstream of said support roller as the paper moves along the paper feed path; and
   a restricting member mounted to said curl eliminating plate, said restricting member engaging and restraining said support roller when the pivotal cover is closed.

5. The curl eliminating unit as claimed in claim 4, further comprising a projecting guide portion downstream, on the paper feed path, of the paper tray, wherein said holding members are downstream of said projecting guide portion.

6. The curl eliminating unit as claimed in claim 4, further comprising:
   an expansible coil spring associated with each holding member, each said expansible coil spring mounted between said associated holding member and the main body case to apply a force for causing said associated holding member to pivot around its pivotal mounting; and
   a stopper extending from the main body case at each side for engaging said support roller to prevent further pivoting by said holding members.

7. The curl eliminating unit as claimed in claim 4, wherein each holding member has an elongated slot, said supporting roller movably mounted in said elongated slots.

8. The curl eliminating unit as claimed in claim 4, wherein said restricting member has an L-shaped lower surface, said L-shaped lower surface engaging said support roller during closing of the cover and holding said support roller in a notch of the L-shaped lower surface when the cover is closed.

9. The curl eliminating unit as claimed in claim 8, wherein said restricting member comprises two restricting elements, each said restricting element having the L-shaped lower surface.

10. The curl eliminating unit as claimed in claim 9, wherein said two restricting elements are mounted substantially along each side of said curl eliminating plate.

11. The curl eliminating unit as claimed in claim 4, wherein said nose portion extends upstream of a plane that is tangential to a downstream side of said support roller, the plane being perpendicular to a second plane defined by a surface supporting the printing unit when in an operating position.

12. A curl eliminating unit for a printing unit, the printing unit having a main body case, a paper tray mounted in the main body case for holding roll paper, means for feeding paper from the roll paper along a paper feed path, and a pivotal cover pivotally mounted to the main body case for providing access to at least the roll paper, the curl eliminating unit comprising:
 a projecting guide portion downstream, on a paper feed path, of the paper tray;
 a holding member pivotally mounted at each side of said main body case, said holding member downstream of said projecting guide portion;
 a support roller mounted between said holding members in a manner that permits movement away from and toward said projecting guide portion and over which paper being removed from the roll paper passes;
 a curl eliminating plate extending from the pivotal cover and having a nose portion for engaging the paper downstream of said support roller as the paper moves along the paper feed path;
 a restricting member mounted to said curl eliminating plate, said restricting member engaging and restraining said support roller when the pivotal cover is closed;
 an expansible coil spring associated with each said holding member for causing pivotal movement of said holding members; and
 a stopper at each side of the main body case for engaging said support roller and stopping further pivotal movement by said holding members.

13. The curl eliminating unit as claimed in claim 12, wherein each holding member has an elongated slot, said supporting roller movably mounted in said elongated slots.

14. The curl eliminating unit as claimed in claim 12, wherein said restricting member has an L-shaped lower surface, said L-shaped lower surface engaging said support roller during closing of the cover and holding said support roller in a notch of the L-shaped lower surface when the cover is closed.

15. The curl eliminating unit as claimed in claim 12, wherein said restricting member comprises two restricting elements, each said restricting having the L-shaped lower surface.

16. The curl eliminating unit as claimed in claim 15, wherein said two restricting elements are mounted substantially along each side edge of said curl eliminating plate.

17. The curl eliminating unit as claimed in claim 12, wherein said nose portion extends upstream of a plane that is tangential to a downstream side of said support roller, the plane being perpendicular to a second plane defined by a surface supporting the printing unit when in an operating position.

* * * * *